United States Patent
Liu

(10) Patent No.: US 9,171,346 B2
(45) Date of Patent: Oct. 27, 2015

(54) METHOD AND DEVICE FOR MOVEMENT OF IMAGE OBJECT

(75) Inventor: Yang Liu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 310 days.

(21) Appl. No.: 13/812,514

(22) PCT Filed: Aug. 9, 2011

(86) PCT No.: PCT/CN2011/078148
§ 371 (c)(1),
(2), (4) Date: Jan. 27, 2013

(87) PCT Pub. No.: WO2012/022229
PCT Pub. Date: Feb. 23, 2012

(65) Prior Publication Data
US 2013/0169691 A1    Jul. 4, 2013

(30) Foreign Application Priority Data
Aug. 20, 2010   (CN) .......................... 2010 1 0259856

(51) Int. Cl.
*G06F 3/048* (2013.01)
*G06T 1/00* (2006.01)
*G06F 3/0481* (2013.01)
*G06F 3/0488* (2013.01)

(52) U.S. Cl.
CPC . *G06T 1/00* (2013.01); *G06F 3/048* (2013.01); *G06F 3/0481* (2013.01); *G06F 3/04883* (2013.01)

(58) Field of Classification Search
CPC ............................ G06F 3/0481; G06F 3/0488
See application file for complete search history.

(56) References Cited

U.S. PATENT DOCUMENTS

| | | | |
|---|---|---|---|
| 2004/0261038 A1* | 12/2004 | Ording et al. ................. | 715/792 |
| 2008/0115081 A1* | 5/2008 | Sankaravadivelu et al. .. | 715/783 |
| 2010/0077328 A1* | 3/2010 | Berg et al. ..................... | 715/764 |
| 2010/0275152 A1* | 10/2010 | Atkins et al. .................. | 715/788 |

FOREIGN PATENT DOCUMENTS

| | | |
|---|---|---|
| CN | 1771474 A | 5/2006 |
| CN | 1855021 A | 11/2006 |
| CN | 1955901 A | 5/2007 |

* cited by examiner

Primary Examiner — Ke Xiao
Assistant Examiner — Weiming He
(74) Attorney, Agent, or Firm — Kilpatrick Townsend & Stockton LLP

(57) ABSTRACT

Provided is a method for the movement of an image object. In the method: A. determining the direction of movement of an image object to be moved, and a module X corresponding to same; B. moving the module X along the direction of movement by one unit; determining whether or not an overlap exists between the module X and another module; if not, terminating the process; otherwise, determining the module having the overlap with the module X as a blocking module; restoring the module X to the original position before swapping locations with the blocking module; determining whether or not all other modules apart from the module X and the blocking module can be properly placed; if yes, terminating the process; otherwise, executing step C; C. determining whether or not the module X can continue to move along the direction of movement; if not, terminating the process; otherwise, moving the module X by one unit; determining whether or not all other modules apart from the module X can be properly placed; if yes, terminating the process; otherwise, repeat step C. Employment of the solution provided in the present invention allows for an improved success rate for the movement of the image object.

14 Claims, 4 Drawing Sheets

METHOD AND DEVICE FOR MOVEMENT OF IMAGE OBJECT

This application is a US National Stage of International Application No. PCT/CN2011/078148, filed Aug. 9, 2011, designating the United States, and claiming the benefit of Chinese Patent Application No. 201010259856.2, filed with the Chinese Patent Office on Aug. 20, 2010 and entitled "Method and apparatus for moving icon", both of which are hereby incorporated by reference in their entireties.

FIELD

The present invention relates to a mobile terminal and particularly to a method and apparatus for moving a graphic object in a mobile terminal.

BACKGROUND

A mobile terminal, e.g., a smart phone, etc., is typically provided with a display screen of a specific size, and an area corresponding to the display screen is referred to as a display area of typically a rectangular shape on which graphic objects (which can be icons, widgets, plain pictures, etc.) corresponding to various applications can be displayed, and a user can simply click on a graphic object to access a function corresponding thereto. Moreover in order to allure a user to use a mobile terminal, e.g., an existing smart phone, etc., the mobile terminal allows the user to drag the various graphic objects as needed, that is, change in location of the graphic objects. If there are a small number of graphic objects in the display area, then no problem may arise, but if there are a large number of graphic objects (and accordingly there is a smaller idle area), then different graphic objects may overlap so that the graphic objects may fail to be moved, thus causing inconvenient use by the user and degrading an experience of the user.

SUMMARY

In view of this, a general aspect of the invention is to provide a method of moving a graphic object in order to improve a ratio of success in moving a graphic object.

Another aspect of the invention is to provide an apparatus for moving a graphic object in order to improve a ratio of success in moving a graphic object.

In order to attain the foregoing aspects, the technical solution of the invention is embodied as follows:

A method of moving a graphic object includes:

A. determining a module X and a movement direction corresponding to a graphic object to be moved;

B. moving the module X by one unit in the movement direction, determining whether the module X overlaps with another module, and if not so, then determining a post-movement status as a movement result and ending the process; or otherwise, determining the another module overlapping with the module X as an obstructive module, resuming in location the module X and then exchanging in location the module X with the obstructive module, and determining whether all the other modules than the module X and the obstructive module can be placed properly, and if so, then determining a post-placement status as a movement result and ending the process; otherwise, performing a step C;

C. determining whether the module X can be further moved in the movement direction, and if not so, then indicating that the movement fails and ending the process; otherwise, moving the module X by one unit in the movement direction, and determining whether all the other modules than the module X can be placed properly, and if so, then determining a post-placement status as a movement result and ending the process; otherwise, repeating the step C.

An apparatus for moving a graphic object includes a first processing unit, a second processing unit and a third processing unit where:

the first processing unit is configured to determine a module X and a movement direction corresponding to a graphic object to be moved; and the second processing unit is configured to move the module X by one unit in the movement direction, to determine whether the module X overlaps with another module, and if not so, to determine a post-movement status as a movement result and to end the process; otherwise, to determine the another module overlapping with the module X as an obstructive module, to resume in location the module X and then exchange in location the module X with the obstructive module, and to determine whether all the other modules than the module X and the obstructive module can be placed properly, and if so, to determine a post-placement status as a movement result and to end the process; otherwise, to instruct the third processing unit to perform its own function; and the third processing unit is configured to determine whether the module X can be further moved in the movement direction, and if not so, to indicate that the movement fails and to end the process; otherwise, to move the module X by one unit in the movement direction, and to determine whether all the other modules than the module X can be placed properly, and if so, to determine a post-placement status as a movement result and to end the process; otherwise, to repeat performing its own function.

As can be apparent, with the technical solution of the invention, a module X corresponding to a graphic object to be moved is moved in a movement direction, and if it does not overlap with another module, then a post-movement status is determined as a movement result; otherwise, it is exchanged in location with the obstructive module, and it is determined whether all the other modules than the module X and the obstructive module can be placed properly after the exchange in location, and when a result of the determination is positive, a post-placement status is determined as a movement result, and when the result of the determination is negative and it is determined that the module X can be further moved in the movement direction, the module X is further moved by another one unit in the movement direction, and it is determined whether all the other modules than the module X can be placed properly, and if a result of the determination is negative, then the foregoing process is repeated until the module X is placed properly, thereby avoiding different graphic objects from overlapping, improving a ratio of success in moving a graphic object, bringing convenient use by a user and improving an experience of the user. Moreover the solution of the invention has strong extensibility and can be applicable to mobile terminals with differently sized display areas. Moreover the solution of the invention is easy to implement, reliable to run, insusceptible to limitations of an operating system platform, a programming language and the like, and convenient to disseminate.

DETAILED DESCRIPTION OF THE EMBODIMENTS

In view of the problem in the prior art, embodiments of the invention propose an entirely new solution to moving a graphic object, which can avoid overlapping of different graphic objects to thereby improve an experience of a user. The graphic object includes but will not be limited to an icon, a widget, a plain picture, etc. The technical solution according to the embodiments of the invention will be further detailed below with reference to the drawings and by way of embodiments in order to make the solution according to the embodiments of the invention more apparent.

Figure 1:
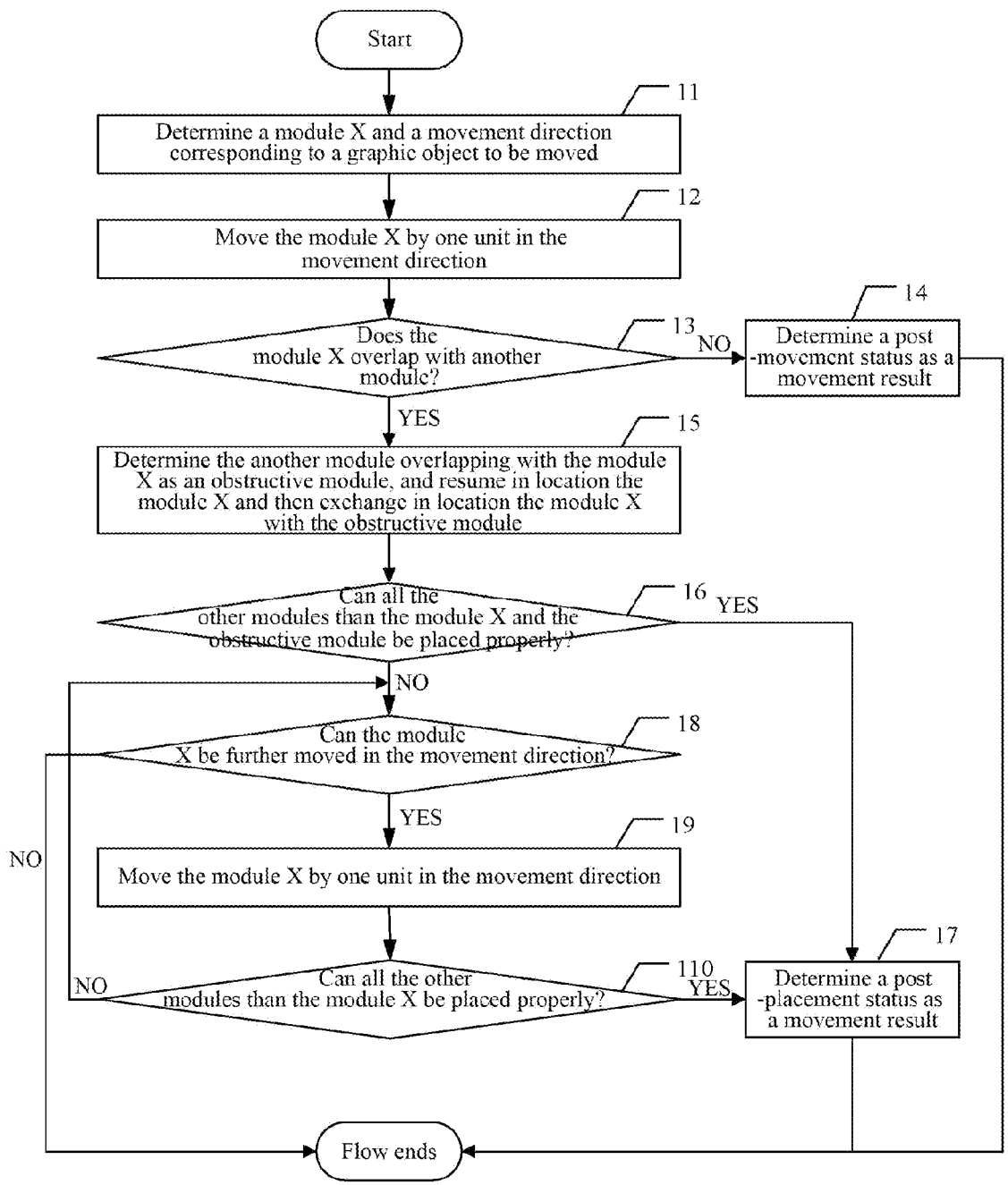
FIG. 1 is a flow chart of an embodiment of a method of moving a graphic object among embodiments of the invention.

FIG. 1 is a flow chart of an embodiment of a method of moving a graphic object among embodiments of the invention. As illustrated in FIG. 1, the method includes the following steps:

Step 11: A module X and a movement direction corresponding to a graphic object to be moved are determined.

For mobile terminals of different manufacturers and different models, their display areas may vary in size, for example, possibly 320×240, that is, the length and the width of the display area are 320 and 240 units respectively, 800× 400 or the like. Each graphic object will occupy an area of a specific size (the length and the width thereof shall be smaller than or equal to the length and the width of the display area), and in this embodiment, an area occupied for a graphic object to be moved is referred to as a module X, where the graphic object to be moved may be a graphic in a regular shape, e.g., a plain picture in a rectangular shape or a square shape, or a graphic in an irregular shape, e.g., a widget in an irregular shape. When the graphic object to be moved is in a regular shape including but not limited to a rectangular shape and a square shape, taking a rectangular shape as an example, the length and the width of the graphic object to be moved are assumed as 20 and 10 respectively, and then the graphic object to be moved occupies an area of 20×10; and when the graphic object to be moved is in an irregular shape, the size of an area occupied thereof is the product of the largest length of the graphic object to be moved in the horizontal direction and the largest length of the graphic object to be moved in the vertical direction, and taking the largest length of 30 in the horizontal direction and the largest length of 20 in the vertical direction of the graphic object to be moved as an example, and then the graphic object to be moved occupies an area of 30×20.

A description will be given taking as an example a graphic object to be moved, which is a rectangular plain picture in the embodiment of the invention for the sake of convenience.

The module X and the movement direction corresponding to the graphic object to be moved can be determined by monitoring an operation of a user. For example, the user selects a graphic object 1 using a cursor and clicks on a Down key, and then an area occupied for the graphic object 1 is determined as the module X and the downward direction is determined as the movement direction. Of course, this is only an example here, and embodiments of the invention will not be limited thereto.

Step 12: the module X is moved by one unit in the movement direction.

Figure 2:
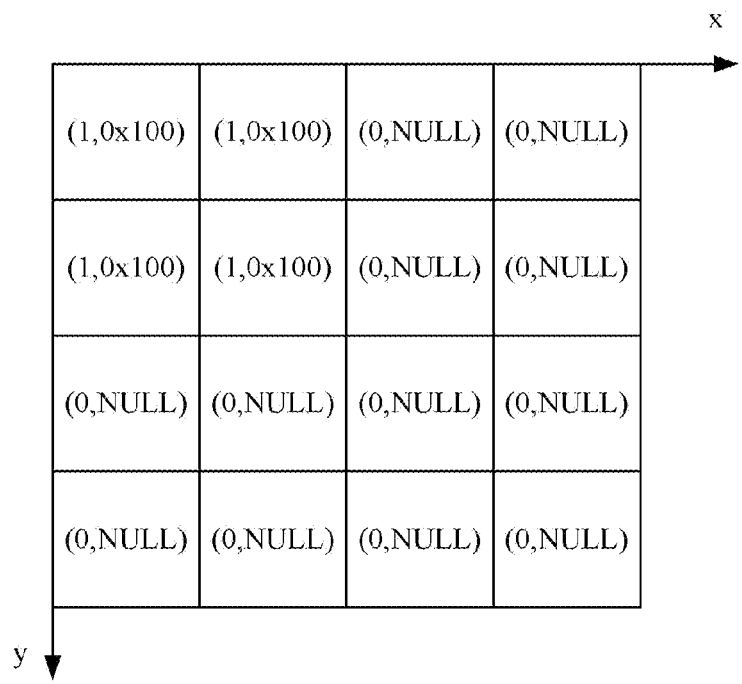
FIG. 2 is a schematic diagram of a mask table in a method embodiment among the embodiments of the invention.

In a practical application, the size of each unit can be set as needed, and as illustrated in FIG. 2, the size of the display area is assumed as 4×4, that is, the largest length of the display area in the horizontal direction is 4 grids, and the largest length thereof in the vertical direction is also 4 grids, and each unit can be set as at least one grid; and if the movement direction is downward and each unit is set as 2 grids, then the module X is moved by one unit in the movement direction, that is, the module X is moved by 2 grids in the vertical direction.

Step 13: It is determined whether the module X overlaps with another module, and if so, then the flow goes to the step 14; otherwise, the flow goes to the step 15.

In a practical application, a 2D structured array, referred to as a mask table, can be maintained for the display area. FIG. 2 is a schematic diagram of a mask table in the method embodiment of the invention. As illustrated in FIG. 2, the size of the display area is assumed as 4×4, and each element in the mask table records two items of contents, one of which records whether a grid corresponding thereto is occupied, where 1 indicates occupancy and 0 indicates no occupancy, and the other of which records a memory address of a module occupying the grid (a memory address of each module is unique), where NULL indicates that the grid is not occupied; and as illustrated in FIG. 2, four grids are occupied, and a memory address of a module occupying these four grids is 0x100.

Thus it can be determined both whether the moved module X overlaps with another module and with which module it overlaps by referring to the mask table.

Step 14: a post-movement status is determined as a movement result, and the flow ends.

Step 15: the module overlapping with the module X is determined as an obstructive module, and the module X is resumed in location and then exchanged in location with the obstructive module.

In this step, the module X is resumed in location, and then the smallest envelope rectangular area of the entire area including the module X and the obstructive module is firstly determined, and then the smallest envelope rectangular area is mirror-inverted taking as an axis a line connecting midpoints of two sides of the smallest envelope rectangular area, which are parallel to the movement direction of the module X, to thereby exchange in location the module X with the obstructive module.

The steps 11 to 15 will be further described below by way of a specific example.

Figure 3:
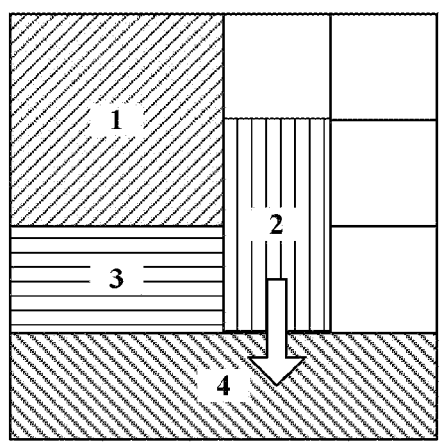
FIG. 3 is a schematic diagram of a display area in the method embodiment among the embodiments of the invention.

FIG. 3 is a schematic diagram of the display area in the method embodiment of the invention. As illustrated in FIG. 3, the size of the display area is assumed as 4×4 including 4 modules in total, which are a module 1, a module 2, a module 3 and a module 4 respectively, and the module 2 is a module corresponding to the graphic object to be moved.

Figure 4:
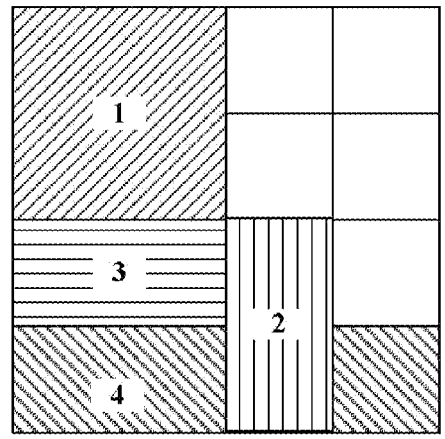
FIG. 4 is a schematic diagram of a module, corresponding to a graphic object to be moved, moved by one unit in a movement direction in the method embodiment among the embodiments of the invention.

FIG. 4 is a schematic diagram of the module, corresponding to the graphic object to be moved, moved by one unit (i.e., one grid) in the movement direction in the method embodiment of the invention. As illustrated in FIG. 4, the moved module 2 will overlap with the module 4, and then the module 4 is an obstructive module (in a practical application, the number of obstructive modules may be more than one, and one obstructive module is taken here as an example)

Figure 5:
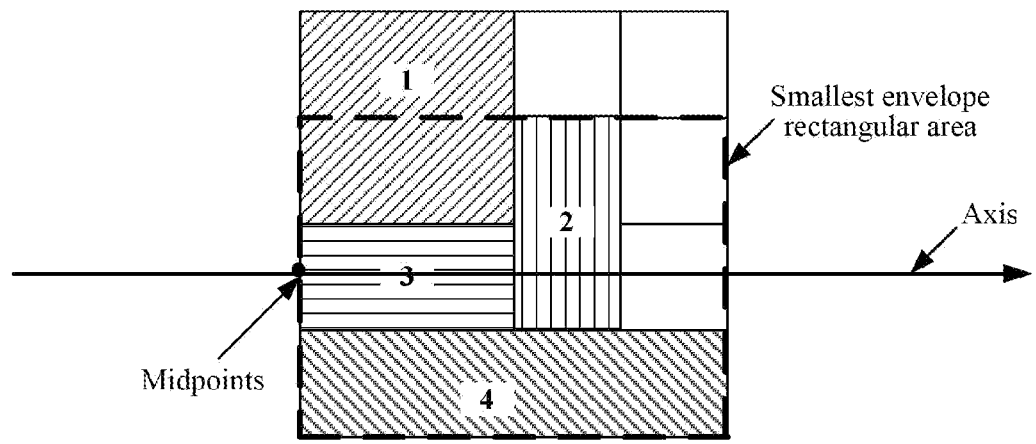
FIG. 5 is a schematic diagram of the smallest envelope rectangular area determined in the method embodiment among the embodiments of the invention.

FIG. 5 is a schematic diagram of the smallest envelope rectangular area determined in the method embodiment of the invention.

Figure 6:
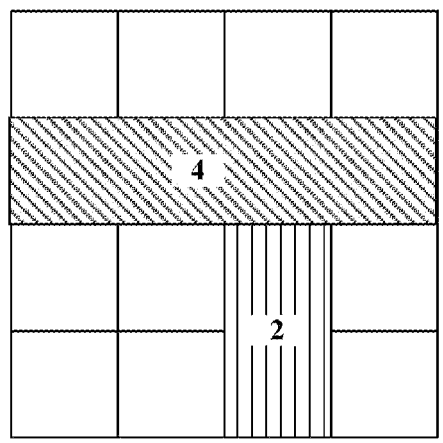
FIG. 6 is a schematic diagram of the smallest envelope rectangular area mirror-inverted in the method embodiment among the embodiments of the invention.

FIG. 6 is a schematic diagram of the smallest envelope rectangular area mirror-inverted in the method embodiment of the invention. As illustrated in FIG. 6, the module 4 and the module 2 are exchanged in location (with the other modules omitted).

Step 16: it is determined whether all the other modules than the module X and the obstructive module can be placed properly, and if so, then the flow goes to the step 17; otherwise, the flow goes to the step 18.

In this step, it is determined whether all the other modules can be placed in another area than the area occupied for the module X and the obstructive module (i.e., a blank area illustrated in FIG. 6) without an overlapping part between any two of the modules, and if so, then the flow goes to the step 17; otherwise, the flow goes to the step 18.

Step 17: a post-placement status is determined as a movement result, and then the flow ends.

Step 18: It is determined whether the module X can be further moved in the movement direction, and if not so, then the movement fails and the flow ends; otherwise, the flow goes to the step 19.

In this step, a mirror-inversion result is processed. If further movement goes beyond the scope of the display area, then it indicates that the module X can not be further moved and the movement fails.

Step 19: the module X is moved by one unit in the movement direction.

Step 110: it is determined whether all the other modules than the module X can be placed properly, and if so, then the flow goes to the step 17; otherwise, the flow repeats the step 18.

In this step, it is determined whether all the other modules can be placed in another area than the area occupied for the module X without an overlapping part between any two of the modules, and if so, then the flow goes to the step 17; otherwise, the flow repeats the step 18.

In this embodiment, the respective modules can be placed in compliance with a specific rule, for example, that coordinates of the respective modules in the perpendicular direction to the movement direction of the module X are kept unchanged to the maximum extent so that if there are a plurality of placement patterns for all the other modules, then it is firstly determined whether there is such a pattern among the patterns that coordinates of all the other modules in the perpendicular direction to the movement direction of the module X can be kept unchanged, and if so, then all the other modules are placed in this pattern; otherwise, all the other modules are placed in a pattern in which the coordinates of the respective modules in the perpendicular direction to the movement direction of the module X are changed to the minimum extent.

Moreover in a practical application, the respective modules can be sorted in a descending order of priorities and those modules with higher priorities can be placed preferentially. For example, the respective modules are sorted in a descending order of the lengths of the respective modules in the movement direction of the module X, and the modules with the same length in the movement direction of the module X are further sorted in a descending order of the lengths thereof in the perpendicular direction to the movement direction of the module X.

The method embodiment illustrated in FIG. 1 has been introduced so far. Subsequently the foregoing process can be repeated if the user wishes to further move a graphic object.

Figure 7:
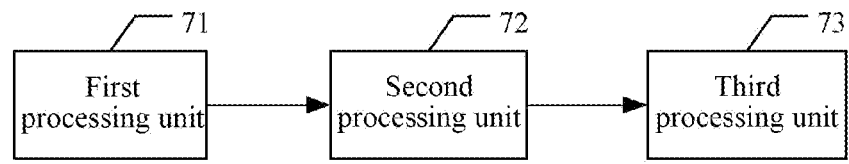
FIG. 7 is a schematic structural diagram of components of an embodiment of an apparatus for moving a graphic object among the embodiments of the invention.

Also an embodiment of the invention provides an apparatus for moving a graphic object. FIG. 7 is a schematic structural diagram of components of an apparatus for moving a graphic object according to an embodiment of the invention. As illustrated in FIG. 7, the apparatus includes a first processing unit 71, a second processing unit 72 and a third processing unit 73, where:

The first processing unit 71 is configured to determine a module X and a movement direction corresponding to a graphic object to be moved; and The second processing unit 72 is configured to move the module X by one unit in the movement direction, to determine whether the module X overlaps with another module, and if they do not overlap, to determine a post-movement status as a movement result and to end the process; or if they overlap, to determine the another module overlapping with the module X as an obstructive module, to resume in location the module X and then exchange in location the module X with the obstructive module, and to determine whether all the other modules than the module X and the obstructive module can be placed properly, and if they can be placed properly, to determine a post-placement status as a movement result and to end the process; or if they can not be placed properly, to instruct the third processing unit 73 to perform its own function; and The third processing unit 73 is configured to determine whether the module X can be further moved in the movement direction, and if it can not be further moved, to indicate that the movement fails and to end the process; or if it can be further moved, to move the module X by one unit in the movement direction, and to determine whether all the other modules than the module X can be placed properly, and if they can be placed properly, to determine a post-placement status as a movement result and to end the process; or if they can not be placed properly, to repeat the process.

Particularly the second processing unit 72 can particularly include (not illustrated for simplicity of the drawings): a first processing sub-unit and a second processing sub-unit, where:

The first processing sub-unit is configured to move the module X by one unit in the movement direction, and to determine whether the module X overlaps with another module, and if they do not overlap, to determine the post-movement status as the movement result and to end the process; and The second processing sub-unit is configured, when they overlap, to determine the another module overlapping with the module X moved by one unit in the movement direction as the obstructive module, to resume in location the module X, to determine the smallest envelope rectangular area of the entire area including the module X and the obstructive module, to mirror-invert the smallest envelope rectangular area taking as an axis a line connecting midpoints of two sides of the smallest envelope rectangular area, which are parallel to the movement direction of the module X, to determine whether all the other modules than the module X and the obstructive module can be placed in another area than the area occupied for the module X and the obstructive module without an overlapping part between any two of the modules, and if they can be placed properly, to determine a post-placement status as a movement result and to end the process; or if they can not be placed properly, to trigger the third processing unit 73.

The third processing unit 73 can particularly include (not illustrated for simplicity of the drawings): a third processing sub-unit and a fourth processing sub-unit.

The third processing sub-unit is configured, when all the other modules than the module X and the obstructive module can not be placed properly, to determine whether the module X can be further moved in the movement direction, and if it can not be further moved, to indicate that the movement fails and to end the process; otherwise, to instruct the fourth processing sub-unit to perform its own function; and The fourth processing sub-unit is configured, when the third processing sub-unit determines that the module X can be further moved in the movement direction, to move the module X by one unit in the movement direction, to determine whether all the other modules than the module X can be placed in another area than the area occupied for the module X without an overlapping part between any two of the modules, and if they can be placed properly, to determine a post-placement status as a movement result and to end the process; or if they can not be placed properly, to trigger the third processing sub-unit.

For a specific operation flow of the apparatus embodiment illustrated in FIG. 7, reference can be made to the corresponding description in the method embodiment illustrated in FIG. 1, and a repeated description thereof will be omitted here.

In summary, the technical solution according to the embodiments of the invention is adopted so that a ratio of success in moving a graphic object can be improved to thereby improve an experience of a user.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer available storage mediums (including but not limited to a disk memory, a CD-ROM, an optical memory, etc.) in which computer available program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The foregoing description is merely illustrative of the preferred embodiments of the invention but not intended to limit the invention, and any modifications, equivalent substitutions, adaptations, etc., made without departing from the spirit and the principle of the invention shall be encompassed in the claimed scope of the invention.

The invention claimed is:

1. A method of moving a graphic object on a display screen of a mobile terminal, comprising:
    A. determining, by the mobile terminal, a module X and a movement direction corresponding to a graphic object to be moved;
    B. moving, by the mobile terminal, the module X by one unit in the movement direction, determining whether the module X overlaps with another module, and if they do not overlap, then determining a post-movement status as a movement result and ending a process of the method; or
    if they overlap, then determining the another module overlapping with the module X as an obstructive module, resuming in location the module X and then exchanging in location the module X with the obstructive module, and determining whether all the other modules than the module X and the obstructive module can be placed properly, and if they can be placed properly, then determining a post-placement status as a movement result and ending the process; or if they cannot be placed properly, then performing a step C; and
    C. determining, by the mobile terminal, whether the module X can be further moved in the movement direction, and if it cannot be further moved, then indicating that the movement fails and ending the process; or if it can be further moved, then moving the module X by one unit in the movement direction, and determining whether all the other modules than the module X can be placed properly, and if they can be placed properly, then determining a post-placement status as a movement result and ending the process; or if they cannot be placed properly, then repeating the step C.

2. The method of moving a graphic object on the display screen of the mobile terminal according to claim 1, wherein the resuming in location the module X and then exchanging in location the module X with the obstructive module comprises:
    resuming in location the module X and determining the smallest envelope rectangular area of an entire area including the module X and the obstructive module; and
    mirror-inverting the smallest envelope rectangular area taking as an axis a line connecting midpoints of two sides of the smallest envelope rectangular area, which are parallel to the movement direction of the module X.

3. The method of moving a graphic object on the display screen of the mobile terminal according to claim 2, wherein:
    the placing properly all the other modules than the module X and the obstructive module comprises: placing all the other modules in another area than the area occupied for the module X and the obstructive module without an overlapping part between any two of the modules; and the placing properly all the other modules than the module X comprises: placing all the other modules in another area than the area occupied for the module X without an overlapping part between any two of the modules.

4. The method of moving a graphic object on the display screen of the mobile terminal according to claim 3, further comprising:

if there are more than two placement patterns, then determining whether there is such a pattern among the patterns that coordinates of all the other modules in the perpendicular direction to the movement direction of the module X can be kept unchanged, and if so, then placing all the other modules in this pattern; otherwise, placing all the other modules in a pattern in which the coordinates of the respective modules in the perpendicular direction to the movement direction of the module X are changed to the minimum extent.

5. The method of moving a graphic object on the display screen of the mobile terminal according to claim 3, wherein the placing all the other modules comprises: sorting the respective modules in a descending order of priorities and placing preferentially those modules with higher priorities.

6. The method of moving a graphic object on the display screen of the mobile terminal according to claim 5, wherein the sorting the respective modules in a descending order of priorities comprises:

sorting the respective modules in a descending order of lengths of the respective modules in the movement direction of the module X, and further sorting the modules with the same length in the movement direction of the module X in a descending order of lengths thereof in the perpendicular direction to the movement direction of the module X.

7. The method of moving a graphic object on the display screen of the mobile terminal according to claim 1, wherein:

the placing properly all the other modules than the module X and the obstructive module comprises: placing all the other modules in another area than the area occupied for the module X and the obstructive module without an overlapping part between any two of the modules; and the placing properly all the other modules than the module X comprises: placing all the other modules in another area than the area occupied for the module X without an overlapping part between any two of the modules.

8. The method of moving a graphic object on the display screen of the mobile terminal according to claim 7, further comprising:

if there are more than two placement patterns, then determining whether there is such a pattern among the patterns that coordinates of all the other modules in the perpendicular direction to the movement direction of the module X can be kept unchanged, and if so, then placing all the other modules in this pattern; otherwise, placing all the other modules in a pattern in which the coordinates of the respective modules in the perpendicular direction to the movement direction of the module X are changed to the minimum extent.

9. The method of moving a graphic object on the display screen of the mobile terminal according to claim 7, wherein the placing all the other modules comprises: sorting the respective modules in a descending order of priorities and placing preferentially those modules with higher priorities.

10. The method of moving a graphic object on the display screen of the mobile terminal according to claim 9, wherein the sorting the respective modules in a descending order of priorities comprises:

sorting the respective modules in a descending order of lengths of the respective modules in the movement direction of the module X, and further sorting the modules with the same length in the movement direction of the module X in a descending order of lengths thereof in the perpendicular direction to the movement direction of the module X.

11. An apparatus for moving a graphic object on a display screen of the apparatus, comprising: one or more non-transitory computer readable storage mediums with program codes stored thereon, wherein the program code is executable by a processor to implement:

a first processing unit configured to determine a module X and a movement direction corresponding to a graphic object to be moved; and a second processing unit configured to move the module X by one unit in the movement direction, to determine whether the module X overlaps with another module, and if they do not overlap, to determine a post-movement status as a movement result and to end a process; or if they overlap, to determine the another module overlapping with the module X as an obstructive module, to resume in location the module X and then exchange in location the module X with the obstructive module, and to determine whether all the other modules than the module X and the obstructive module can be placed properly, and if they can be placed properly, to determine a post-placement status as a movement result and to end the process; or if they cannot be placed properly, to instruct a third processing unit to perform its own function; and the third processing unit configured to determine whether the module X can be further moved in the movement direction, and if it cannot be further moved, to indicate that the movement fails and to end the process; or if it can be further moved, to move the module X by one unit in the movement direction, and to determine whether all the other modules than the module X can be placed properly, and if they can be placed properly, to determine a post-placement status as a movement result and to end the process; or if they cannot be placed properly, to repeat its own function.

12. The apparatus for moving a graphic object on the display screen of the apparatus according to claim 11, wherein the second processing unit comprises: a first processing sub-unit and a second processing sub-unit, and wherein:

the first processing sub-unit is configured to move the module X by one unit in the movement direction, and to determine whether the module X overlaps with another module, and if they do not overlap, to determine the post-movement status as the movement result and to end the process; and the second processing sub-unit is configured, when they overlap, to determine the another module overlapping with the module X moved by one unit in the movement direction as the obstructive module, to resume in location the module X, to determine the smallest envelope rectangular area of the entire area including the module X and the obstructive module, to mirror-invert the smallest envelope rectangular area taking as an axis a line connecting midpoints of two sides of the smallest envelope rectangular area, which are parallel to the movement direction of the module X, to determine whether all the other modules than the module X and the obstructive module can be placed in another area than the area occupied for the module X and the obstructive module without an overlapping part between any two of the modules, and if they can be placed properly, to determine a post-placement status as a movement result and to end the process; or if they cannot be placed properly, to trigger the third processing unit.

13. The apparatus for moving a graphic object on the display screen of the apparatus according to claim 11, wherein the third processing unit comprises: a third processing sub-unit and a fourth processing sub-unit, and wherein, the third processing sub-unit is configured, when all the other modules than the module X and the obstructive module cannot be placed properly, to determine whether the module X can be further moved in the movement direction, and if it cannot be further moved, to indicate that the movement fails and to end the process; and the fourth processing sub-unit is configured, when the third processing sub-unit determines that the module X can be further moved in the movement direction, to move the module X by one unit in the movement direction, to determine whether all the other modules than the module X can be placed in another area than the area occupied for the module X without an overlapping part between any two of the modules, and if they can be placed properly, to determine a post-placement status as a movement result and to end the process; or if they cannot be placed properly, to trigger the third processing sub-unit.

14. The apparatus for moving a graphic object on the display screen of the apparatus according to claim 12, wherein the third processing unit comprises: a third processing sub-unit and a fourth processing sub-unit, and wherein, the third processing sub-unit is configured, when all the other modules than the module X and the obstructive module cannot be placed properly, to determine whether the module X can be further moved in the movement direction, and if it cannot be further moved, to indicate that the movement fails and to end the process; and the fourth processing sub-unit is configured, when the third processing sub-unit determines that the module X can be further moved in the movement direction, to move the module X by one unit in the movement direction, to determine whether all the other modules than the module X can be placed in another area than the area occupied for the module X without an overlapping part between any two of the modules, and if they can be placed properly, to determine a post-placement status as a movement result and to end the process; or if they cannot be placed properly, to trigger the third processing sub-unit.

* * * * *